United States Patent [19]

Worsham

[11] 4,390,190
[45] Jun. 28, 1983

[54] STEERING STABILIZER STRUCTURE FOR THE FRONT WHEELS OF A VEHICLE

[76] Inventor: Doyle H. Worsham, P.O. Box 231, Boaz, Ala. 35957

[21] Appl. No.: 297,506

[22] Filed: Aug. 28, 1981

Related U.S. Application Data

[63] Continuation-in-part of Ser. No. 102,103, Dec. 7, 1979, Pat. No. 4,313,613.

[51] Int. Cl.³ ............................................... B62D 7/08
[52] U.S. Cl. .................................... 280/94; 280/95 A
[58] Field of Search ....................... 280/94, 95 R, 95 A; 267/150

[56] References Cited

U.S. PATENT DOCUMENTS

| | | | |
|---|---|---|---|
| 2,993,704 | 7/1961 | Worsham | 280/94 |
| 3,393,919 | 7/1968 | Ragsdale | 280/94 |
| 3,448,991 | 6/1969 | Leggett | 280/94 |
| 3,721,455 | 3/1973 | Blanton | 280/94 |
| 3,848,885 | 11/1974 | Hefren | 280/94 |
| 3,961,804 | 6/1976 | Blanton | 280/94 |
| 3,980,315 | 9/1976 | Hefren | 280/94 |

Primary Examiner—Robert R. Song
Attorney, Agent, or Firm—Berman, Aisenberg & Platt

[57] ABSTRACT

A stabilizer apparatus adapted to be connected to the steering mechanism of a vehicle such that movement of the steering wheels from a neutral position is resisted by a spring assembly. The apparatus is characterized by a camber plate disposed longitudinally, and affixed to the steering arm at the underside of the steering knuckle sleeve, abutting the wheel kingpin. A recovery bar of the same size as the camber plate is held generally parallel thereto by a pair of coil springs connecting their ends. The recovery bar has a fulcrum pin aligned with the wheel kingpin and underlying the vehicle axle. A second pair of coil springs connect a fixed vehicle mounting member to the recovery bar and urge the latter away from the wheel, the fulcrum pin being guided rectilinearly in a direction parallel to the vehicle axle by a bar pivoted to the fulcrum pin and sliding in a sleeve member affixed to the mounting member. Turning movements of the steering wheel will move the recovery bar transversely of the vehicle axle toward the wheel, and will be resisted by one spring of each pair of coil springs.

14 Claims, 9 Drawing Figures

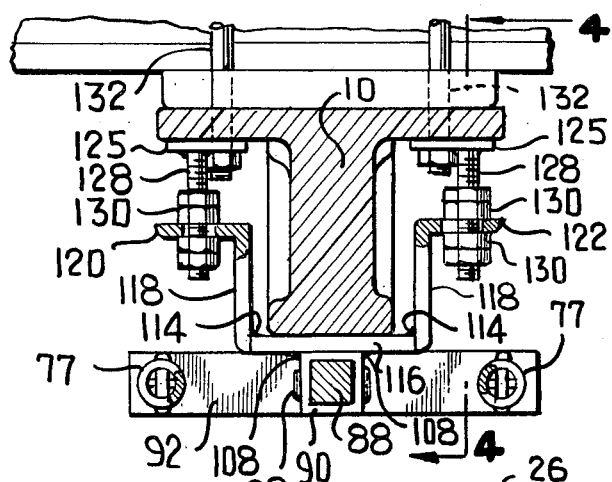
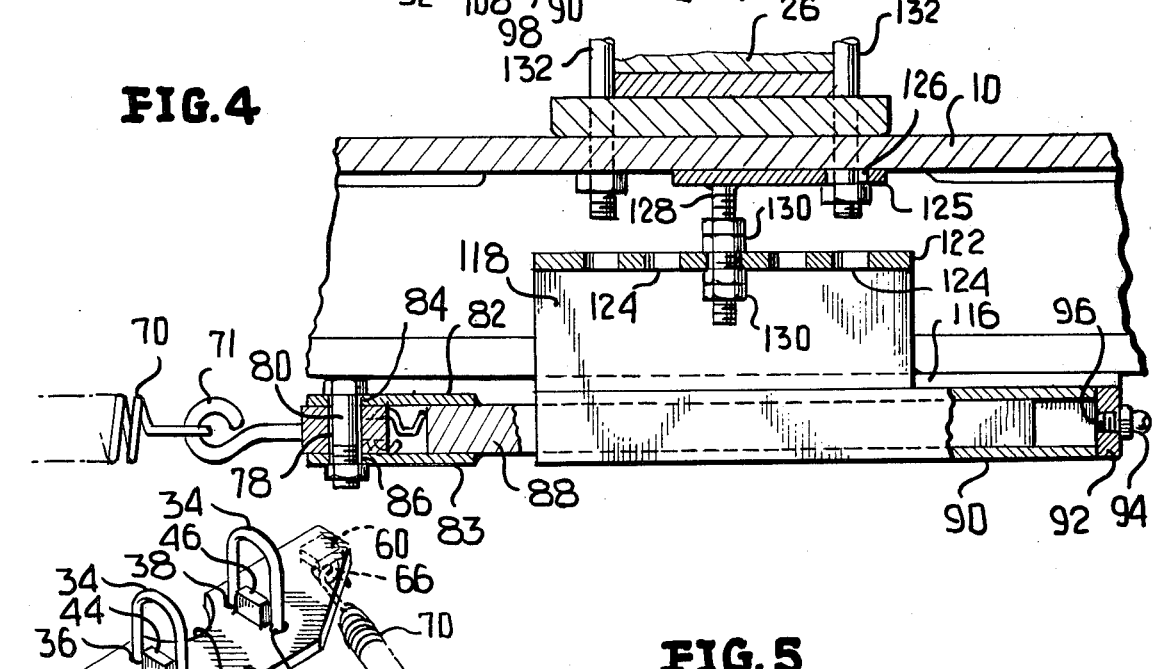
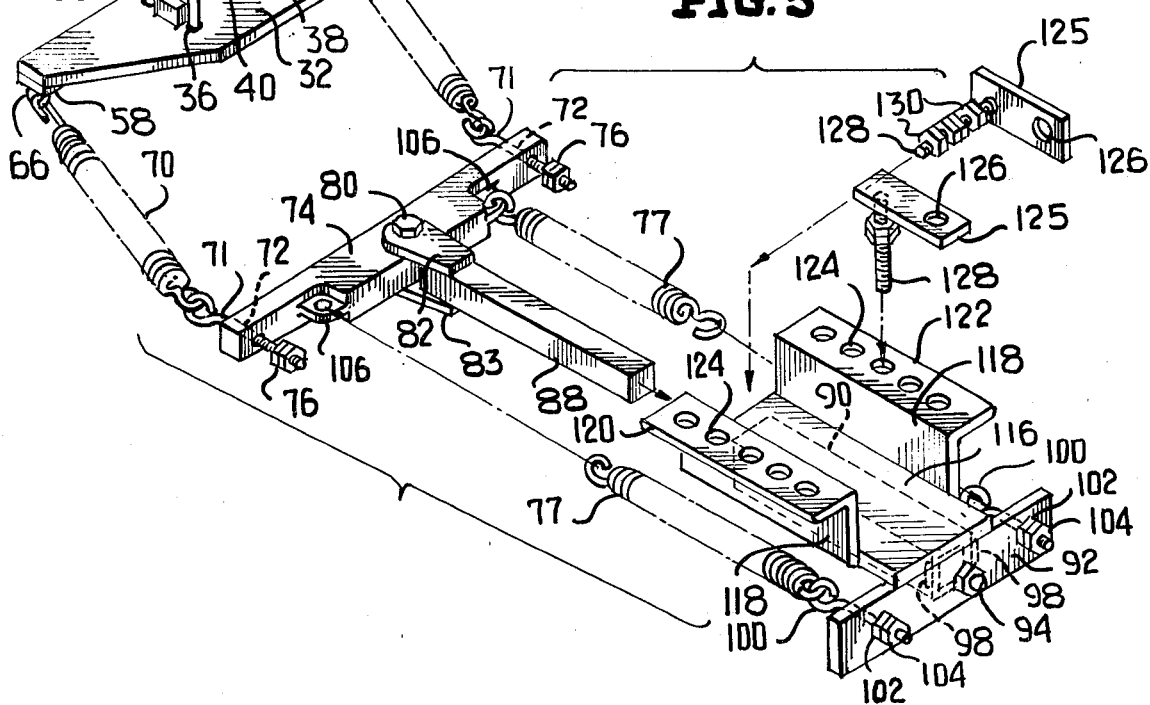

STEERING STABILIZER STRUCTURE FOR THE FRONT WHEELS OF A VEHICLE

This application is a continuation-in-part of my co-pending application Serial No. 102,103 filed Dec. 7, 1979, now U.S. Pat. No. 4,313,613, and represents various improvements in the invention disclosed therein.

FIELD OF THE INVENTION

This invention relates to stabilizer apparatus for steering systems of vehicles, and more particularly to a stabilizer structure suitable for use with heavy duty vehicles such as trucks and tractor trailers.

BACKGROUND OF THE INVENTION

Motor vehicles conventionally have their steerable wheels arranged in pairs, pivotally mounted at the opposite ends of a cross member, or axle, and steerable in unison through a suitable linkage. The paired steerable wheels are prone to misalignment, by upsetting of their adjustments through road shocks and wear in various parts, and such misalignment results in considerable expense to repair and to avoid excessive tire wear. Sudden and unexpected steering wheel misalignments occur when a tire blows out or a wheel strikes a curb or other comparable obstacles, and frequently cause loss of control and severe damage and injury to the vehicle and its occupants.

A solution to the problems posed by misalignments of both types mentioned is disclosed in the Worsham U.S. Pat. No. 2,993,704 issued July 25, 1961, and in the Worsham U.S. Pat. No. 3,833,235 issued Sept. 3, 1974. Various different solutions are set forth in other prior art patents, as for example:

Hefren U.S. Pat. No. 3,980,315; Ragsdale U.S. Pat. No. 3,393,919; Legget U.S. Pat. No. 3,448,991; and Blanton U.S. Pat. No. 3,961,804.

It is to these same problems that the present invention is directed and with the further objective of simplifying the structure and installation of the apparatus with resultant economies of expense.

SUMMARY OF THE INVENTION

The primary object of the present invention is to provide an improved steering control for stabilizing a steering wheel of a heavy duty vehicle such as a truck, or tractor trailer.

Another important object of the present invention is to provide an improved steering stabilizer structure which employs a minimum number of springs to resist turning of the wheel and to return the wheel to its neutral position, the springs being assembled in a configuration involving a minimum of space so as to yield an inexpensive and practical stabilizer structure even for heavy duty vehicles.

A further object of the invention is to provide an improved steering stabilizer structure, having the above described characteristics which, with a minimum number of variations, will fit and can be easily installed on many types and sizes of heavy duty vehicles and without the necessity to provide many different parts or parts of different size in the stabilizer to enable its installation and subsequent practical operation.

A still further important object of the invention is to provide an improved steering stabilizer structure having the above described characteristics, in which all the parts are of simplified design and which may be easily and quickly assembled and installed on a vehicle, thereby keeping the cost of fabrication and installation at a minimum.

To meet the above objects, the improved stabilizer embodies a horizontal camber plate affixed to the steering arm at the underside of the steering knuckle and having a portion abutting the wheel kingpin. A recovery bar of the same size as the camber plate is held parallel to the plate by a pair of coil springs connecting their ends. The recovery bar has a fulcrum pin aligned with the mentioned portion of the camber plate and lying in a vertical fulcrum plane bisecting the vehicle axle. A second pair of coil springs in tension connect the recovery bar to a mounting member affixed to the underside of the axle. Movements of the fulcrum pin are guided rectilinearly and parallel to the vehicle axle by a bar pivoted to the fulcrum pin and slidably received in a sleeve fastened to the mounting member. Thus, turning movements of the vehicle wheel will move the recovery bar fulcrum pin rectilinearly toward the wheel resisted by the second pair of springs, and turning of the wheel will be further resisted by one spring of each of said pairs of coil springs.

The above stated and various other objects and advantages of the invention will become readily apparent to those skilled in the art upon reading the following detailed description and claims and by referring to the accompanying drawings forming a part hereof, wherein like numerals refer to like parts throughout.

BRIEF DESCRIPTION OF THE DRAWINGS

FIG. 3 is a fragmentary enlarged sectional view taken on line 3—3 of FIG. 1 and looking in the direction of the arrows, but showing mainly the stabilizer mounting member fastened to the vehicle axle;

FIG. 4 is a fragmentary enlarged sectional view taken on line 4—4 of FIG. 3 and looking in the direction of the arrows;

FIG. 5 is an exploded perspective view of the stabilizer apparatus arranged for assembly on the vehicle but showing stabilizer parts only;

DETAILED DESCRIPTION OF THE PREFERRED EMBODIMENTS

Figure 1:
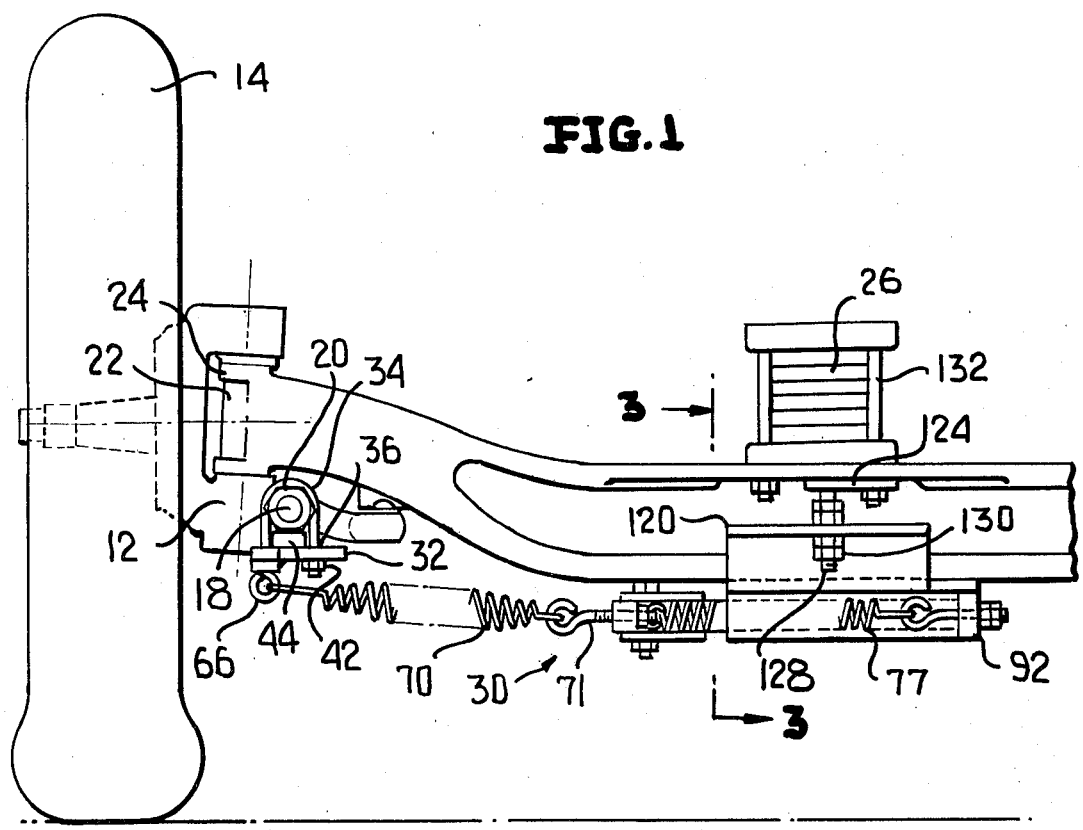
FIG. 1 is a front elevational view of a stabilizer apparatus in accordance with the invention installed on a truck axle to control the right front wheel.

Referring now more specifically to the drawings, the reference numeral 10 designates a T-beam axle from one end of which a steering knuckle 12 is oscillatably supported. The knuckle is rigidly affixed to a front truck wheel 14 and includes a projecting sleeve portion 16, FIG. 2, open at its opposite ends and through which one end of a steering arm 18 extends, and is secured by means of a castellated nut 20. The wheel knuckle rotates about kingpin 22, supported at a slight incline to the vertical in an axle collar 24 and passing through the knuckle. The axle is transversely supported from longitudinal leaf springs 26 in a conventional manner.

The structure thus far described above is conventional for vehicles and, particularly, for heavy duty trucks and tractor-trailers. The novel stabilizer structure unit constituting the present invention is generally designated 30 in FIGS. 1, 2 and 5 and comprises the parts to be described.

To anchor the springs of the stabilizer arrangement, a horizontal camber plate 32 is used which is elongated longitudinally of the vehicle and affixed to steering arm 18 by a pair of U-bolts 34, 34. The legs of the U-bolts pass through two pairs of openings 36, 38, which are spaced so that the U-bolts clamp the steering arm immediately adjacent the ends of the sleeve 16 and adjacent or on the castellated nut 20. A circular recess 40 in the outer edge of the camber board or plate 32, herein called a fulcrum recess, receives the knuckle and kingpin structure, so that when the camber plate 32 is clamped tightly by nuts 42 applied to the bottoms of bolts 34, the plate will turn with the wheel about the kingpin. Preferably fulcrum recess 40 is slightly offset, about one inch, from the center of the outer edge of the camber plate so that the longer end extends forwardly of the vehicle in the direction of the arrow A, in FIG. 2. This allows the stabilizer to be mounted on many trucks, with or without front wheel brakes, and permits space for proper operation of the stabilizer unit springs.

Camber plate 32 is further provided with a pair of abutment blocks 44, 46 which are welded or otherwise firmly secured to the upper surface of the plate and function to support or cradle the adjacent portions of the sleeve 16, steering arm 18 and castellated nut 20. Another pair of blocks 58, 60 are similarly secured to the under surface at the end portions of the camber plate for strengthening thereof, and eyebolts 66, 66 are threadedly secured in the blocks to receive the hook ends of a pair of coil springs 70, 70.

The other ends of the springs 70, 70 are hooked into eyebolts 71, 71 which pass through apertures 72, 72 in the ends of a recovery bar 74 which has the same length as camber plate 32. The free ends of the eyebolts 71, 71 receive stop and lock nuts 76 for adjusting their effective lengths retained in the recovery bar and the tension of springs 70, 70, when the recovery bar is pulled under the force of a second pair of tension springs 77, 77.

The recovery bar has an off center opening 78 passing vertically through the bar and receiving a fulcrum pin or bolt 80, which is in line with the center of fulcrum recess 40 in the camber plate and the kingpin 22, and which underlies the center line of axle 10. Upper and lower yoke plates 82, 83 are pivotally secured to fulcrum pin 80, which passes through vertically aligned apertures 84, 86 in the yoke plates. The yoke plates are integrally connected, as by welding, to a bar 88 which slideably moves in sleeve 90. Preferably both the bar and hollow sleeve have non-circular cross sections to prevent turning of the bar while providing rectilinear guidance for movements of the fulcrum pin 80. The inner end of the sleeve 90 is closed by a cross bar 92 which is firmly affixed thereto in a manner to be described and in which a grease fitting 94 enables feeding of grease through an aperture 96, into sleeve 90 to lubricate and ease movements of bar 88. The cross bar 92 is fixedly attached to the end of sleeve 90 in any suitable way as by welds 98 at the side of the tube, see FIG. 5, and the bar extends forwardly and rearwardly of the vehicle. Eyebolts 100 pass through apertures in the projecting portions of the bar and receive the hook ends of expansion springs 77 for adjustably tensioning these springs by turning adjusting nuts 102 and lock nuts 104. The other ends of the springs 77 are hooked into a pair of eyes 106 which are formed in the recovery bar 74 at equal distances forward and rearwardly of the fulcrum pin aperture 78, or pin 80.

For fixedly positioning the springs 77, cross bar 92, sleeve 90, and the related parts of the stabilizer structure with respect to the vehicle and the steerable wheel, the tube 90 is welded or otherwise affixed centrally to the underside of a rectangular mounting plate 116 by welds 108 as best seen in FIG. 3. This mounting plate is supported under axle 10, with the sleeve 90 directed axially under the center of the axle to align with the fulcrum pin 80 and kingpin 22, by a pair of upstanding, inverted angle bracket plates 118, welded to the forward and rearward edges of mounting plate 116 as by welds 114, FIG. 3. The plates 116, 118 together form a mounting member having a U-shaped cross section which seats and cradles the axle 10, and the brackets 118 provide out-turned, horizontal, forward and rearward extending flanges 120, 122 each having a series of aligned, central apertures 124 which enable the mounting member to be adjustably affixed to the axle at a proper distance from the vehicle wheel being stabilized. The means for affixing the mounting member 116, 118 comprise a pair of brackets, each being simply a metal strip 125 having an opening 126 therethrough near one end and a threaded stud 128 projecting from one face near the other end. A series of nuts 130 serve as spacers and lock nuts to hold plate 116 tightly against the underside of axle 10. The studs 128 are passed through the appropriate openings 124 in the mounting flanges 120, 122 after U-bolts 132, 132 (FIGS. 3 and 4) which secure the leaf springs 26 to the axle 10, have been secured in openings 126 of the strips 125. The described mounting bracket structure makes it easy to suspend the mounting plate 116 directly under the axle at an adjustable distance from the wheel and at an adjustable height, and with the pair of plates 118 at the front and rear sides of the axle.

The described stabilization structure may quickly and easily be installed on a vehicle in the following steps:

Step 1: A right front camber plate 32 is chosen and fastened snugly over control arm 18 and against castellated nut 20 by means of U-bolts 34;

Step 2: Spring handing U-bolts 132, (front and rear) are loosened and refastened through openings 126 of bracketed strips 125, care being taken to place front and rear brackets properly;

Step 3: Wheel springs 70 are hooked one end into eyes 66 of the camber plate and their opposite ends into eyebolts 71 on recovery bar 74. The square bar 88 is then slid into sleeve 90; then springs 77 are hooked into eyes 106 of the recovery bar and eyebolts 100 on cross bar 92;

Step 4: The mounting tube assembly 116, 118, 90 is pulled toward the middle of axle 10 and studs 128 are inserted into the openings 124 and best fitted by hand tension. Spacer and lock nuts 130 are then run on and tightened to clamp plate 116 tightly against the axle;

Step 5: The nuts 102, 104 on eyebolts 100 are tightened as are corresponding nuts on eyebolts 71 to properly tension the pairs of springs 77, 77 and 70, 70; and Step 6: Grease tube 90 through fitting 94 and fulcrum pin 80 (if desired through a similar fitting not shown).

Stabilizer apparatus similar to that shown above but a mirror image of the same is installed also on the left front steerable wheel of the vehicle. The two stabilizers operate to limit the wheels from unintentionally deviating from their normal course and to quickly return the wheels to their normal straight line course without detriment to normal steering of the vehicle.

Figure 2:
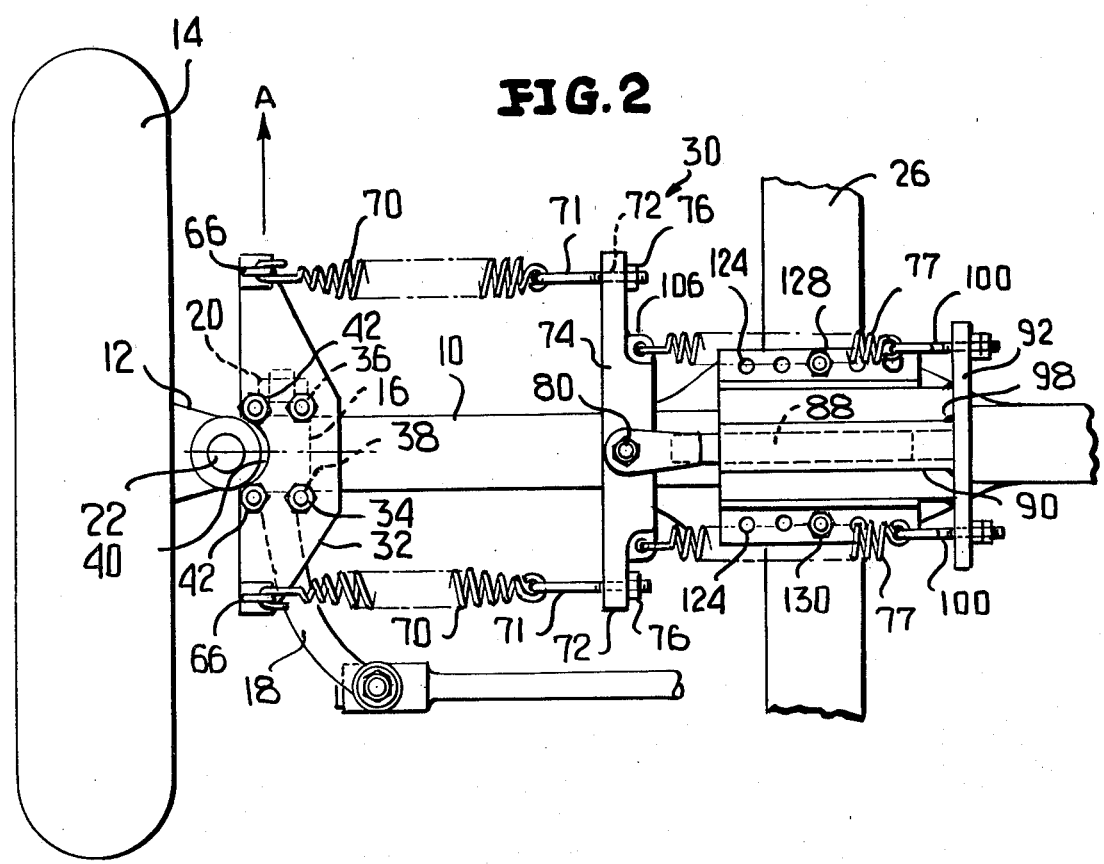
FIG. 2 is a bottom plan view of the stabilizer apparatus shown in FIG. 1.
Figure 6:
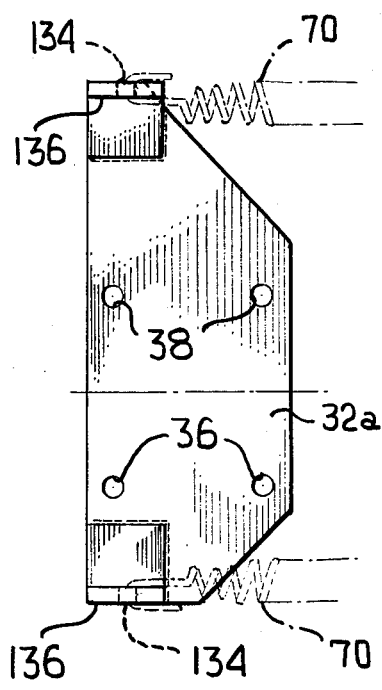
FIG. 6 is a plan view of a modified camber plate suitable for installation on certain vehicles.

In operation of the installed stabilizer unit, the springs 77, 77 having been adjusted in tension to exert a suitable force on fulcrum pin 80 in a direction away from wheel 14, FIG. 2, recovery bar 74 will be roughly parallel to camber plate 32 held thus by the pair of springs 70, 70 stretched to suitable lengths. Now, should an obstruction in the road, or other means, cause the wheel to turn clockwise as viewed in FIG. 2, the camber plate 32 will turn with the wheel stretching and lengthening the lower spring 70 leftward and partially shortening or collapsing the upper spring 70. This causes the fulcrum pin 80 and the center of the recovery bar to move toward the wheel against the resistance of springs 77, 77 and guided rectilinearly by sliding movement of bar 88 in sleeve 90. The recovery bar will also turn clockwise about the moving fulcrum pin 80 causing the lower expansion spring 77 to expand further which offers resistance to the turning of the wheel, while the upper expansion spring 77 is somewhat compressed. Thus, both the lower wheel spring 70 and the lower expansion spring 77 resist turning of the wheel and quickly cause the recovery bar pin 80 to move back away from the wheel and the lower part of the recovery bar to turn counterclockwise, returning the wheel to its normal straight course. When the wheel is unintentionally turned in the opposite direction, i.e., counter-clockwise as viewed in FIG. 2, the fulcrum pin 80 and center of the recovery bar are again pulled toward the wheel against the force of springs 77, 77 but the recovery bar 74 is turned counter-clockwise about fulcrum pin 80 expanding the upper springs of 70 and 77 and contracting the lower springs of 70 and 77. Thus, both the upper spring 70 and the upper spring 77 exert force to quickly return the recovery bar and wheel directions to their normals, as shown in FIG. 2. Since two springs operate simultaneously to return the wheel, they are normally sufficient to function quickly even with large wheels on heavy duty vehicles. Further, since guidance means 88, 90 is disposed in the plane of the vehicle axle, and insures that the fulcrum pin of bar 74 moves and directs its force in this plane, a minimum of space is required for the spring assembly.

It will be noted from the above that the present invention operates substantially identically with the invention described in my copending application 102,103, mentioned above and of which this application is a continuation-in-part. A principal difference between the present and parent application is that many of the parts have been simplified so that they are easier and less costly to fabricate and assemble, and faster to install. This has been done without loss of efficiency of operation.

Figure 8:
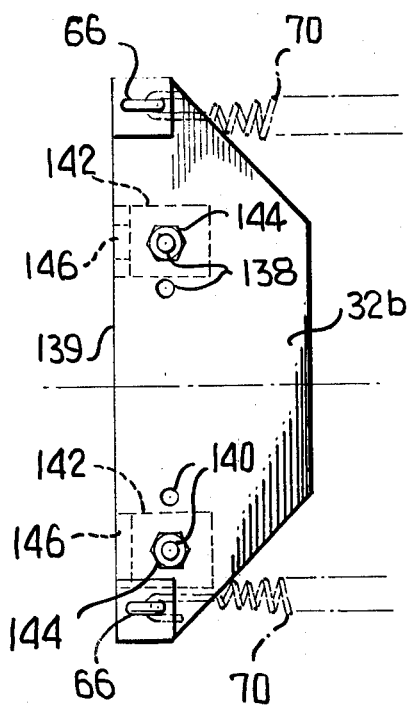
FIG. 8 is a plan view of another modified camber plate.
Figure 7:
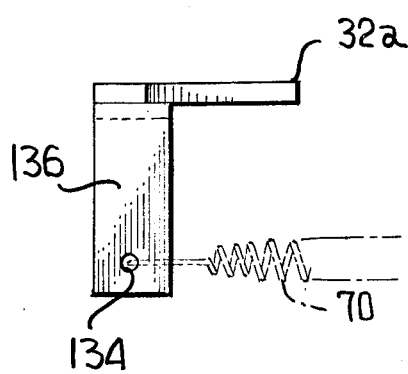
FIG. 7 is a side elevational view of the camber plate of FIG. 6.

While extension investigation and testing has revealed that a single size camber plate is suitable for use and fits many trucks and truck axles, a modified and simpler camber plate 32a as illustrated in FIGS. 7 and 8 has been found desirable to install on Mack trucks of various sizes. Camber plate 32a differs from that illustrated in FIG. 2 by omission of the forward central recess 40 for the vehicle kingpin, the support blocks 44 and the eyes 66. Instead, a pair of flat strips 136 bent 90° are welded to the plate to extend its outer edge forwardly and rearwardly. Apertures 134, 134 are provided in these strips to hook the outer ends of the springs 70, 70. The usual pairs of openings 36, 36 and 38, 38 are provided in the camber plate to receive the U-bolts which fasten the camber plate to the steering arm. Other than the differences mentioned, the camber plate 32a is intended to be used with identical structure as illustrated in FIGS. 1 and 2 and to be installed and operated in an identical manner.

Figure 9:
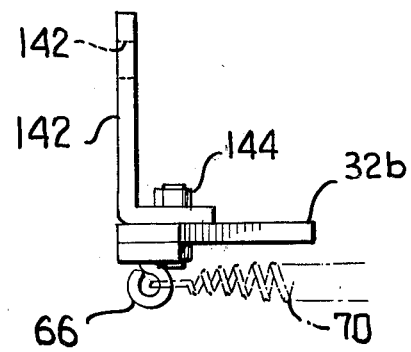
FIG. 9 is a side elevational view of the plate of FIG. 8.

Another modified camber plate 32b, illustrated in FIGS. 8 and 9, has been found desireable to install on G.M.C. trucks and school buses having 6000 lb. truck axles. This camber plate will fit trucks and buses not having castellated nuts such as 20, FIG. 2, on the steering arm spindle. The Chevrolet C-50 and C-60 trucks fall in this category. As will be noted from FIGS. 8 and 9, camber plate 32b like plate 32a is devoid of a recess in its outer edge 139 such as 40, FIG. 2. Pads having an eye 66 are welded or otherwise secured to a surface of the camber plate 32b near the extremities of its outer edge, and these as in the FIG. 2 embodiment hook the ends of springs 70, 70. A pair of openings 138, 138 at one side of this center of the camber plate and a similar pair of openings 140, 140, at the other side of the center by appropriate selection enable the pair of strips 142 bent 90° to be adjustably fastened by bolts and nuts 144, 144 to project outwardly from the outer edge 139 of the chamber plate. An opening 146 is provided in the free end of each strip 142 and these openings receive the bolts which fasten the camber plate to the steering wheel spindle. Other than the differences mentioned, the camber plate 32b is intended to be used with identical stabilizer structure as illustrated in FIGS. 1 and 2 and to be installed and operated in identical manner.

The foregoing is considered as being illustrative only of the principle of the invention. Since numerous modifications and changes will readily occur to those skilled in the art, it is not intended to limit the invention to the exact construction and operation shown and described, and accordingly all suitable modifications and equivalents may be resorted to, falling within the scope of the invention.

What is claimed is:

1. Steering stabilizer structure for the steering wheels of a vehicle designed to be affixed beneath each extremity of the axle thereof and attached to the wheel steering arms at the steering knuckles, said structure including a wheel camber plate adapted to be located adjacent the underside of the steering knuckle sleeve and disposed longitudinally of said vehicle, means for securing said camber plate to the steering arm, a recovery bar spaced inwardly of said camber plate, at least a first pair of spaced apart spring means connected between said bar and plate, said recovery bar having a fulcrum pin slightly offset from its center and adapted to underlie the vehicle axle, a mounting member having means for fixed attachment to the underside of the vehicle axle, a second pair of spring means connected between said mounting member and said recovery bar urging the recovery bar away from said camber plate, and guide means on said recovery bar and mounting member restraining said fulcrum pin to move rectilinearly below and parallel to the vehicle axle, whereby turning movement of the vehicle wheel will move the recovery bar away from the mounting member and toward the wheel and will be resisted by said first and second spring means.

2. Steering stabilizer structure as set forth in claim 1 wherein said first and second pairs of spring means are coil springs mounted in tension.

3. Steering stabilizer structure as set forth in claim 2, wherein said guide means comprises a bar member pivoted to said recovery bar about said fulcrum pin and a hollow sleeve member fixed to said mounting member slideably receiving the bar member.

4. Steering stabilizer structure as set forth in claim 3, wherein said bar member is non-circular in cross section and said sleeve member is of corresponding cross-sectional shape whereby the bar is slideably and non-rotatably received in said sleeve member.

5. Steering stabilizer structure as set forth in claim 3, wherein said mounting member comprises an elongated bracket having a U-shaped cross-section adapted to cradle and seat against the underside of the vehicle axle, said sleeve member being affixed to the underside of said bracket and extending longitudinally thereof.

6. Steering stabilizer structure as set forth in claim 5, wherein the upper edges of said U-shaped bracket are provided with out-turned horizontal flanges, each of said flanges having a longitudinal series of apertures for selectively receiving a fastening element of said attachment means, whereby to permit horizontal adjustment of said mounting member along the vehicle axle.

7. Steering stabilizer structure as set forth in claim 6, wherein said attachment means for fixing the mounting member to the underside of the vehicle axle comprises a pair of separate flat strips each apertured near one end to receive one end of a U-bolt fastening the vehicle springs to its axle, said fastening element of the attachment means for selective insertion into one of the series of apertures of the mounting member flange being a threaded stud projecting from one side of the flat strip near its other end and adapted to threadedly receive spacing and locking nuts.

8. Steering stabilizer structure as set forth in claim 5, wherein a cross bar is affixed to said U-shaped bracket and extends transversely beyond the sides thereof, means being provided near the ends of the cross bar to adjustably fasten the ends of said second pair of coil springs.

9. Steering stabilizer structure according to claim 8 wherein said cross bar is affixed to said U-shaped bracket at one end thereof and also closes one end of the sleeve member, the closing portion of the cross bar being provided with an aperture and a grease fitting therein to lubricate the interior of the sleeve member.

10. Steering stabilizer structure according to claim 8, wherein said recovery bar has a pair of eyelets equally spaced forwardly and rearwardly of said fulcrum pin, said second pair of coil springs being hooked into said pair of eyelets, said means for adjustably fastening the coil springs to the cross bar comprising transverse apertures with eyebolts therein and nuts threaded on the eyebolts to adjust the tension of the springs.

11. Steering stabilizer structure according to claim 2, wherein said means for securing said camber plate to the steering arm comprises a pair of U-bolts for embracing the steering arm on each end of the steering knuckle and passing through two pairs of spaced openings in the camber plate for reception of securing nuts at the underside of the camber plate.

12. Steering stabilizer structure according to claim 11, wherein said camber plate has a fulcrum recess for the wheel kingpin, said fulcrum pin of the recovery bar being aligned with said fulcrum recess and each being offset slightly rearwardly of the centers of said plate and bar by the same amount.

13. Steering stabilizer structure according to claim 2, wherein said first pair of spaced apart coil springs are connected to said camber plate at the ends of a pair of strips secured to the camber plate and extending forwardly and rearwardly thereof.

14. Steering stabilizer structure according to claim 2, wherein said means for securing said camber plate to the vehicle steering arm comprise a pair of strips secured to the camber plate on opposite sides of its center and projecting outwardly from the outer edge thereof, said strips having openings therethrough to receive fastening bolts.

* * * * *